(12) United States Patent
Pangilinan et al.

(10) Patent No.: US 9,503,791 B2
(45) Date of Patent: Nov. 22, 2016

(54) HOME SCREEN INTELLIGENT VIEWING (71) Applicant: EchoStar Technologies L.L.C., Englewood, CO (US)

(72) Inventors: Melissa Pangilinan, Glendale, CA (US); Danny J. Minnick, Castle Rock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 14/597,540

(22) Filed: Jan. 15, 2015

(65) Prior Publication Data

US 2016/0212491 A1 Jul. 21, 2016

(51) Int. Cl.
| H04N 21/482 | (2011.01) |
| H04N 21/2187 | (2011.01) |
| H04N 21/4147 | (2011.01) |
| H04N 21/442 | (2011.01) |
| H04N 21/45 | (2011.01) |
| H04N 21/472 | (2011.01) |

(52) U.S. Cl.
CPC ...... *H04N 21/4826* (2013.01); *H04N 21/2187* (2013.01); *H04N 21/4147* (2013.01); *H04N 21/44222* (2013.01); *H04N 21/4532* (2013.01); *H04N 21/47217* (2013.01)

(58) Field of Classification Search
CPC .......... H04N 21/4532; H04N 21/466; H04N 21/4756; H04N 21/4826
See application file for complete search history.

(56) References Cited

U.S. PATENT DOCUMENTS

| 6,769,127 | B1 | 7/2004 | Bonomi et al. |
| 7,877,765 | B2 | 1/2011 | Bhogal et al. |
| 7,912,824 | B2 | 3/2011 | Anguiano |
| 7,954,120 | B2 | 5/2011 | Roberts et al. |
| 8,132,205 | B2 | 3/2012 | VanDuyn et al. |
| 2002/0174429 | A1* | 11/2002 | Gutta ................. H04N 5/44543 725/46 |
| 2003/0061239 | A1 | 3/2003 | Yoon |
| 2003/0084448 | A1 | 5/2003 | Soundararajan |
| 2003/0217365 | A1 | 11/2003 | Caputo |
| 2003/0220100 | A1 | 11/2003 | McElhatten et al. |
| 2004/0078823 | A1 | 4/2004 | Schlarb et al. |
| 2004/0261096 | A1 | 12/2004 | Matz |
| 2005/0028208 | A1 | 2/2005 | Ellis et al. |
| 2005/0120369 | A1 | 6/2005 | Matz |
| 2005/0149964 | A1 | 7/2005 | Thomas et al. |

(Continued)

FOREIGN PATENT DOCUMENTS

| CN | 1579089 A | 2/2005 |
| EP | 2 768 233 A1 | 8/2014 |

(Continued)

OTHER PUBLICATIONS

Govinde, "Intuitive Timer," U.S. Appl. No. 14/542,262, filed Nov. 14, 2014, 35 pages.

(Continued)

*Primary Examiner* — John Schnurr
(74) *Attorney, Agent, or Firm* — Seed IP Law Group LLP (57) ABSTRACT

The disclosure relates systems and methods for analyzing viewing habits on an audiovisual content receiving device such as a set-top box, including both program recording and viewing habits for live programs, and to determine viewer preferences for audiovisual events such as television programs for any given timeslot.

16 Claims, 10 Drawing Sheets

(56) References Cited

U.S. PATENT DOCUMENTS

| | | |
|---|---|---|
| 2005/0160461 A1 | 7/2005 | Baumgartner et al. |
| 2005/0210530 A1 | 9/2005 | Horvitz et al. |
| 2005/0246738 A1 | 11/2005 | Lockett et al. |
| 2006/0129547 A1 | 6/2006 | Yamamoto et al. |
| 2006/0184967 A1 | 8/2006 | Maynard et al. |
| 2007/0033607 A1 | 2/2007 | Bryan |
| 2007/0154163 A1 | 7/2007 | Cordray |
| 2007/0192796 A1 | 8/2007 | Iwabuchi et al. |
| 2007/0244747 A1* | 10/2007 | Nikovski ............ G06Q 30/0255 705/14.53 |
| 2008/0059884 A1 | 3/2008 | Ellis et al. |
| 2008/0184297 A1 | 7/2008 | Ellis et al. |
| 2009/0019488 A1 | 1/2009 | Ruiz-Velasco et al. |
| 2009/0077589 A1 | 3/2009 | Boyer et al. |
| 2009/0100463 A1 | 4/2009 | St. John-Larkin |
| 2009/0133081 A1 | 5/2009 | Sakai et al. |
| 2009/0259518 A1 | 10/2009 | Harvey et al. |
| 2010/0192172 A1* | 7/2010 | Thomas ............. G06Q 30/0241 725/9 |
| 2010/0251304 A1 | 9/2010 | Donoghue et al. |
| 2011/0211813 A1 | 9/2011 | Marks |
| 2011/0214147 A1* | 9/2011 | Kashyap ............. G11B 27/105 725/46 |
| 2012/0117017 A1 | 5/2012 | Phillips et al. |
| 2012/0331494 A1 | 12/2012 | Pontual et al. |
| 2013/0097623 A1 | 4/2013 | Lai et al. |
| 2013/0238544 A1 | 9/2013 | Kunjithapatham et al. |
| 2014/0089953 A1 | 3/2014 | Chen et al. |
| 2014/0189743 A1* | 7/2014 | Kennedy ................ H04N 21/84 725/46 |
| 2014/0282636 A1* | 9/2014 | Petander ............ H04N 21/4663 725/1 |
| 2015/0143413 A1 | 5/2015 | Hall et al. |
| 2016/0037204 A1 | 2/2016 | McSweeney et al. |

FOREIGN PATENT DOCUMENTS

| | | |
|---|---|---|
| GB | 2476136 A | 6/2011 |
| JP | 11-220673 A | 8/1999 |
| JP | 2000-293539 A | 10/2000 |
| JP | 2001-223959 A | 8/2001 |
| JP | 2003-189333 A | 7/2003 |
| JP | 2003284008 A | 10/2003 |
| JP | 2006-121252 A | 5/2006 |
| JP | 2009-21644 A | 1/2009 |
| KR | 10-2004-0102961 A | 12/2004 |
| WO | 99/45700 A1 | 9/1999 |
| WO | 02/25939 A2 | 3/2002 |
| WO | 2009/048753 A1 | 4/2009 |

OTHER PUBLICATIONS

Navarro, "Scheduled Programming Recommendation System," U.S. Appl. No. 14/493,038, filed Sep. 22, 2014, 49 pages.

Sanchez et al., "User interest modeling for social TV-recommender systems based on audiovisual consumption," *Multimedia Systems* 19:493-507, 2013.

Su et al., "A Survey of Collaborative Filtering Techniques," *Advances in Artificial Intelligence*, vol. 2009, Article ID 421425, 2009, 19 pages.

International Search Report and Written Opinion, mailed Dec. 7, 2015, for International Application No. PCT/US2015/051269, 13 pages.

* cited by examiner

Add examples

60 — Event Identification and Classification

60a — Name:

60b — Series name:

60c — Genre (Theme):

60d — Sub-Genre (Sub-theme):

60e — ID number

60f — Time recorded:

60g — Time typically viewed:

60h — Names of actors in the program:

*FIG. 3*

Determine the most watched TV programs followed by most watched categories (e.g., sports – themes / subthemes?)

HOME SCREEN INTELLIGENT VIEWING

BACKGROUND

1. Technical Field

The present disclosure relates to audiovisual content distribution and consumption and, in particular, to systems and methods that determine viewing habits and viewer preferences.

2. Description of the Related Art

Viewers have access to a wide range of audiovisual program choices from a number of different audiovisual content providers.

BRIEF SUMMARY

The disclosure relates systems and methods for analyzing viewing habits on an audiovisual content receiving device such as a set-top box, including both program recording and viewing habits for live programs, and to determine viewer preferences for audiovisual events (e.g., programs) during any timeslot.

A viewer typically has access to a wide range of audiovisual event choices from a number of different audiovisual content providers. Some content providers, such as Dish Network™, Netflix™ and Amazon Prime™, provide viewers with the ability to select and watch movies in an on-demand fashion. Other content providers, including Dish Network, provide multiple channels of audiovisual content that is continually streamed over each channel and immediately available for viewing by, for example, selecting a particular channel on a set-top box that is attached to a television display. The streamed content is then shown on the television display during that current timeslot. Content that is provided this way is referred to as "live" content. Often, this live content is available to the viewer over a subscription service that includes many hundreds of channels. In addition, content providers, including Dish Network, also provide the ability to record live content streamed at one timeslot for viewing at a later time. This is referred to as "time-shifted" or "recorded" content.

By analyzing the viewing habits, for example the repeated viewing patterns, of live content and time-shifted content that are captured by the set-top box, together with future programming information from an electronic programming guide, it is possible to understand viewer preferences for available programs during a timeslot. For example, by understanding how regularly a viewer watches one series show live, versus when the viewer records a late-night live show to watch it that following morning at 6 a.m. before work. Another example is to understand the genre of programs typically viewed during a timeslot and comparing that with similar genres of available programs. Available programs include live programs as well as recorded programs available at that timeslot. In addition, content preferences may also be inferred based on the most popular live content being watched within the viewer's geographical area.

DETAILED DESCRIPTION

Figure 1:
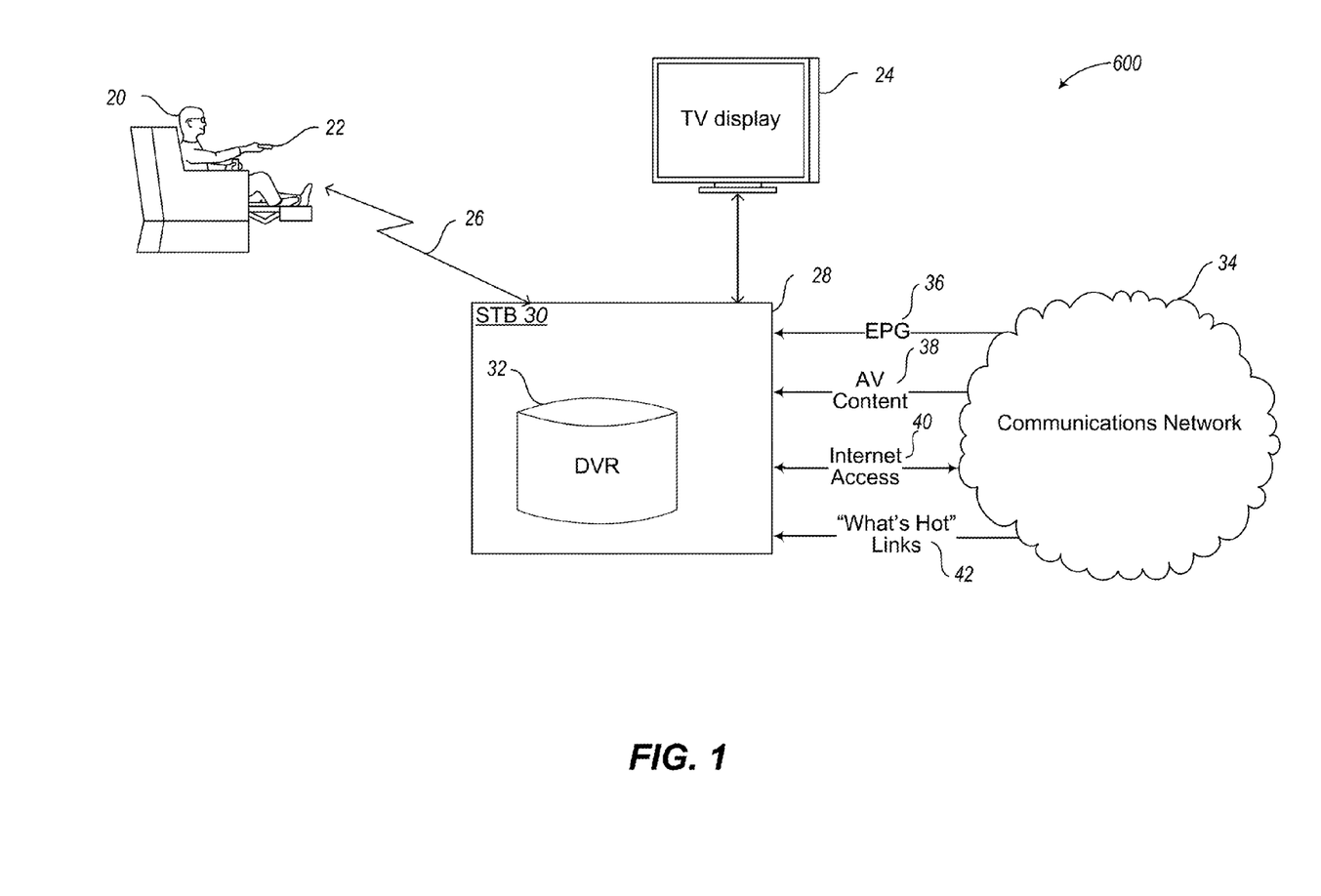
FIG. 1 shows one embodiment of a viewer watching recorded and live audiovisual events.

FIG. 1 contains diagram 600 showing an embodiment of the viewer watching recorded and live audiovisual events. A viewer 20 is using remote control 22 to control commands to a set-top box 30 through wireless communication link 26. Through these commands, the viewer 20 is able to display audiovisual event content on a television display 24. In addition, the viewer 20 is able to record audiovisual events on a digital video recorder (DVR) 32 for later viewing.

In some examples, audiovisual events such as a series episode may be recorded late at night for viewing early the following morning. This activity is sometimes referred to as "time-shifting" an event. Frequently, the time-shifted audiovisual event will be watched at a certain regular time the following day, even though the viewer has the option of watching the event at any time because it has been recorded on the DVR 32.

Frequently, the viewer 20 will watch audiovisual content 38 events on television display 24 as the events are received from the communications network 34. This is referred to watching the event "live." For example, this audiovisual content 38 may be provided through the communications network 34 by an audiovisual content distributor such as DirecTV™ or EchoStar™. Along with the audiovisual content 38, the distributor will provide an electronic program guide (EPG) 36 that lists the channels that are available for viewing and the audiovisual events that are playing during different time slots on each channel. Typically, the EPG 36 can be displayed on television display 24. The viewer 20 then uses remote control 22 to scroll through and select the channel to be viewed. In some embodiments, the EPG 36 also contains information about the audiovisual event. This information, described in more detail below, may include information such as event name, series name, genre (theme) and subgenre (subtheme). This audiovisual event information is received by set-top box 30, and may also be stored on a DVR 32, along with the stored audiovisual event if the viewer 20 has selected the event to be recorded.

The set-top box 30 may also receive Internet access 40 from the communications network 34. This Internet access 40 can provide information about the audiovisual content 38 being provided, and also provide other information that may be relevant to determine the viewing habits of viewer 20. This information may also include a "what's hot" links 42 that describes, for example, on a local, regional or national level what the most popular viewed audiovisual event is at the moment.

Figure 2:
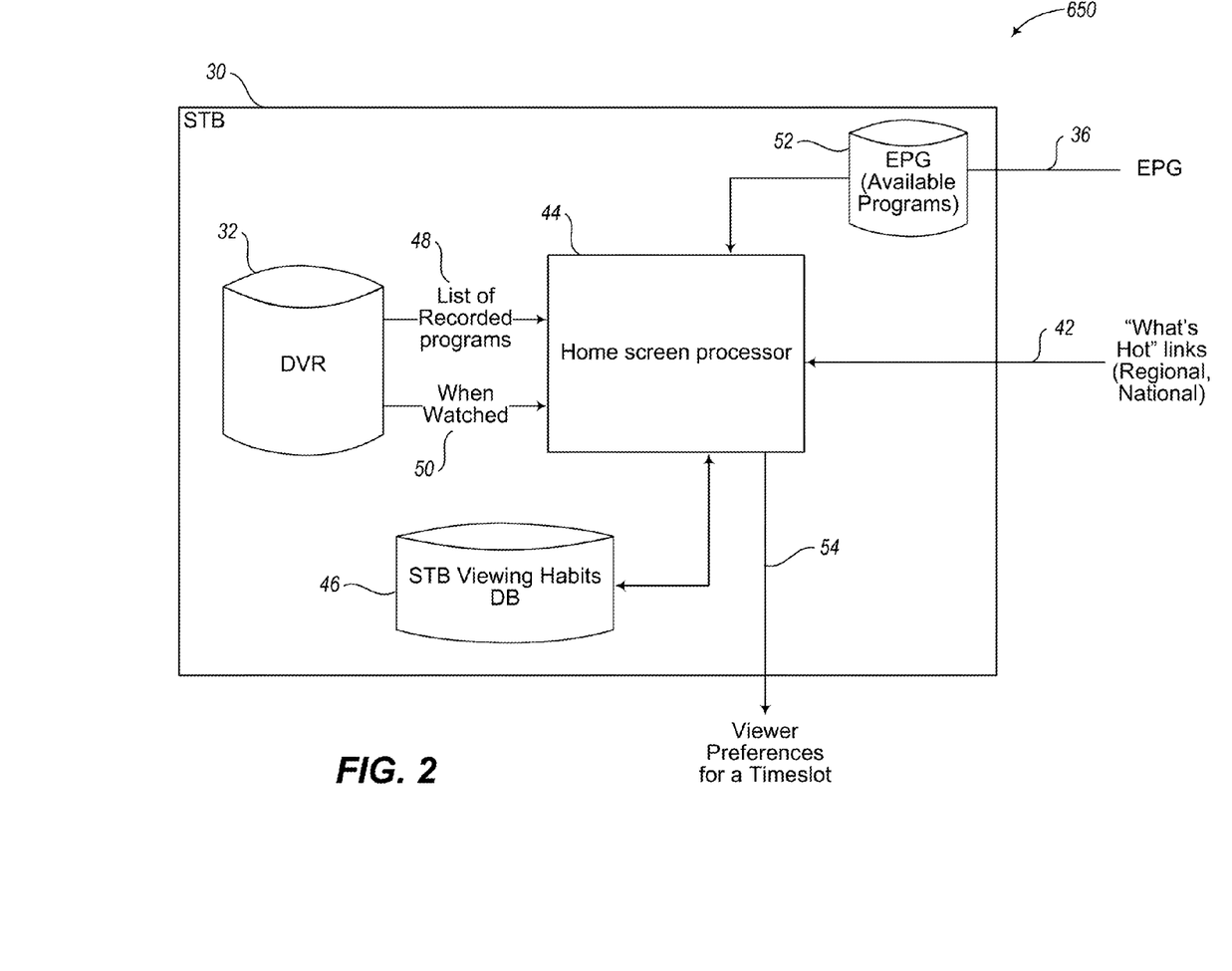
FIG. 2 shows an example embodiment of a Home Screen Processor interacting with multiple inputs to determine viewing habit preferences for a time slot.

FIG. 2 contains diagram 650 that shows one embodiment of a set top box 30 that contains a home screen processor 44 and its inputs. An EPG database 52 receives EPG content 36, and stores it for access by home screen processor 44. The information in the EPG database 52 includes event identification and classification information, including an identification number given by the audiovisual content distributor.

In one or more embodiments, the DVR 32 provides a list of recorded programs 48 to the home screen processor 44. The DVR 32 may also provide the times at which the recorded events are watched by the viewer 20. This information is stored in the set-top box viewing habits database 46, along with the viewing habits of events watched live by a viewer 20.

For example, the set-top box viewing habits database 46 may contain information that the viewer records "The Middle" every night at 10 PM, and will time-shift watch it the following night at 5 PM. The viewer may also watch "Modern Family" every Tuesday night live, and watch Monday night football every Monday live. This information would be sent to the home screen processor 44 for analysis. In addition, the "what's hot" links 42, that include indications of the local, regional and national programs that are the most frequently watched at the current moment, are also provided to the home screen processor 44.

The home screen processor 44, using all of the historical data provided to it as well as current activity data, is able to provide viewer preferences for a particular timeslot 54.

Figure 3:
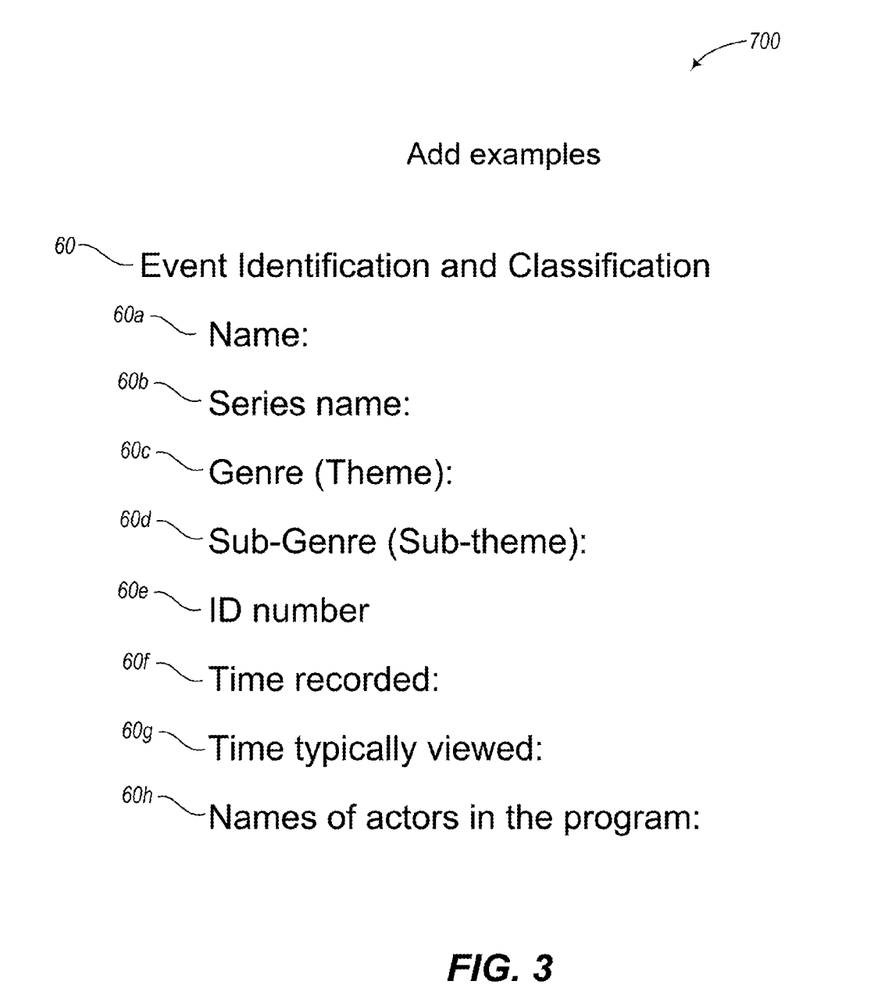
FIG. 3 shows an embodiment of an audiovisual event identification and classification record.

FIG. 3 shows diagram 700 of an example embodiment of an audiovisual event identification and classification record. In this embodiment, the record 60 includes fields 60a through 60h that indicate various attributes of the audiovisual event to be used to determine the viewing habits of a viewer.

The event name 60a includes an alphanumeric name that describes the event, or if it is a series, the series episode name. For example, a movie may have the name "The Big Chill," or an episode of the series "Workaholics" may have the name "Alice Quits" or "S3, Ep13." The series name 60b, given the above example, would be "Workaholics."

Genre 60c, or theme, may include comedy, drama, sports, talk shows, etc. Subgenre 60d includes more detailed descriptions of genre, for example "baseball" under the genre 60c "sports." In this example, the event name 60a may be "Colorado Rockies v. Mariners" that further describes the event. Event ID 60d may also include the team names if they are not in the program name.

The event ID number 60e, in some embodiments, may include an 8-digit ID that can identify either a single event or a series event. Time recorded 60f is the time that the event was recorded (time-shifted) on the viewer's DVR 32. The time typically viewed 60g represents the time that the viewer viewed the recorded event. In some examples, this field may have multiple times associated with it to indicate each time the viewer viewed the event. The names of actors in the program 60h represent the actual or stage names of the actors appearing in the program.

Figure 4:
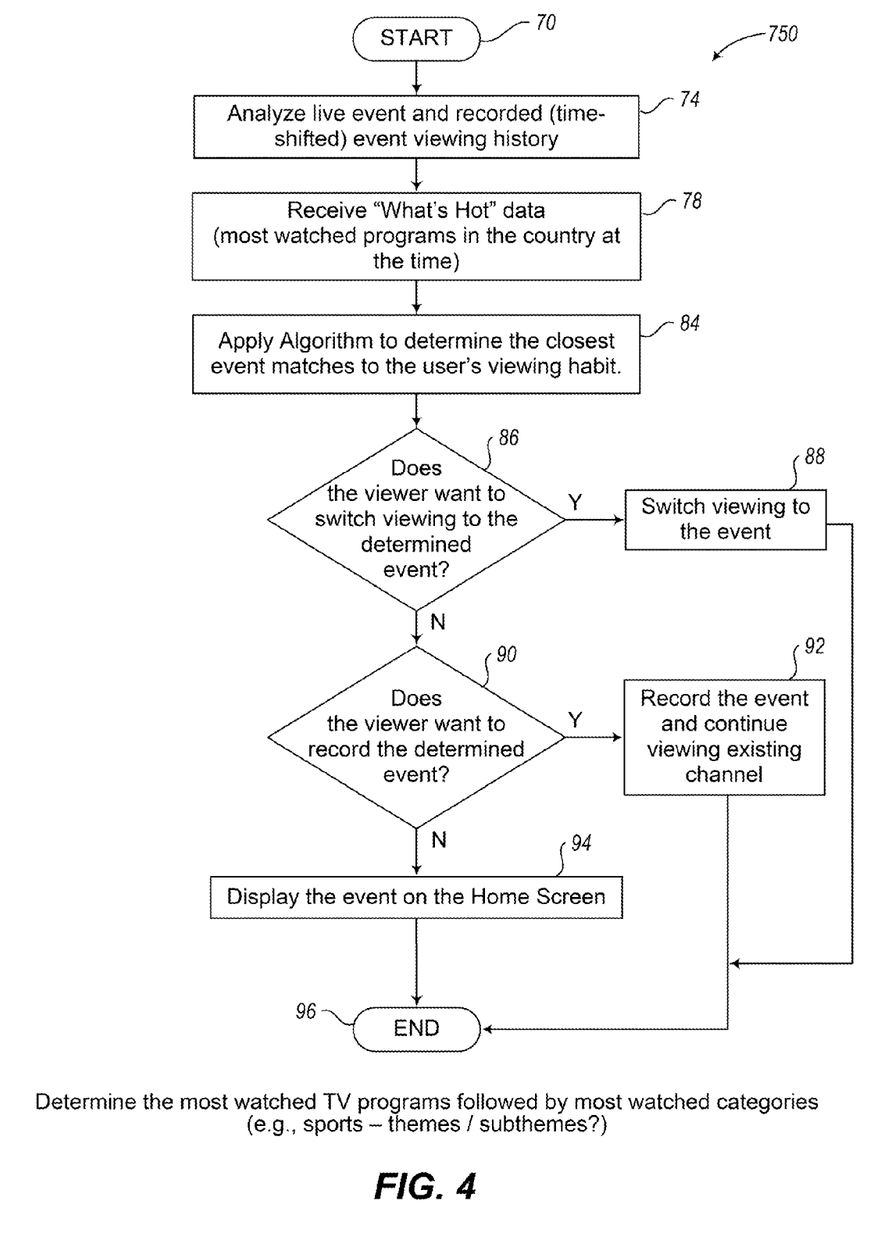
FIG. 4 shows a flow diagram for determining what the viewer should be watching right now.

FIG. 4 shows diagram 750 representing a flow chart, "Top-level Home Screen Viewing Algorithm (What I Should Be Watching Right Now)," that describes a method to determine what the viewer 20 would prefer to be watching right now.

The method starts at step 70.

At step 74, the method analyzes the live set-top box event viewing history of the viewer. The data used at this step includes data stored in the set-top box viewing habits database 46 that includes a detailed history of viewing habits for a viewer. In some embodiments, the set-top box is able to distinguish between viewers, for example a mom, a dad and a child that are watching display 24 using set-top box 30. Information on each event viewed, and by whom, is then analyzed for patterns including the name of the event, series name of the event if any, genre of the event (theme), subgenre (subtheme), event ID number, on what channel the event was viewed, and when it was viewed.

The method at this step also analyzes the DVR recorded (time-shifted) event viewing history. This analysis looks for viewing patterns using, for each viewer, the name of the event, series name of the event if any, genre of the event (theme), subgenre (subtheme), event ID number, on what channel the event was recorded, and when the recorded event was viewed.

At step 78, the method receives "What's Hot" data. This data represents the audiovisual event that is most widely watched, representing for example local, regional or national viewing data. In addition, this data may also be made available for different genre types 60c or for different types of viewer demographics, for example children under the age of 12, women ages 18 to 30, or men over 50.

At step 84, the method applies an algorithm to determine the closest event match to the viewer's viewing habit. The algorithm uses as its input data received by and determined from steps 74 and 78. The algorithm is then applied and an audiovisual event that most closely matches the viewing habit of the viewer for a particular timeslot is determined.

In one embodiment, the method determines if the viewer has a habit of viewing one or more particular audiovisual events at the current time. For example, if it is 6:30 PM on a weekday night, the viewer may regularly watch the evening news on channel 107 at that time, and the Home Screen would present the news on channel 107 to the viewer on the display 24. In another example, if the viewer typically watches the evening news on channel 107 at 6:30 PM and watches a time-shifted episode of The Middle at 7 PM, however, because of a breaking news scenario, the evening news is delayed until 7 PM, the method would now have two audiovisual events available to present the viewer at 7 PM. The algorithm would then use the results of viewing habits to determine which event should be displayed on the Home Screen at the 7 PM timeslot.

At step 86, the method determines whether the viewer wants to switch from the currently viewed event (or program channel) to the determined event that most closely matches the viewer's viewing habit. If so, at step 88 the determined event is switched and is now displayed to the viewer on display device 24, and the method ends at 96.

Otherwise, at step 90, the method determines whether the viewer wants to record the determined event. If so, at step 92 the determined event is recorded on DVR 32 and the method ends at 96.

Otherwise, at step 94, the determined event is displayed on the viewer's Home Screen, and the method ends at 96.

Figure 5:
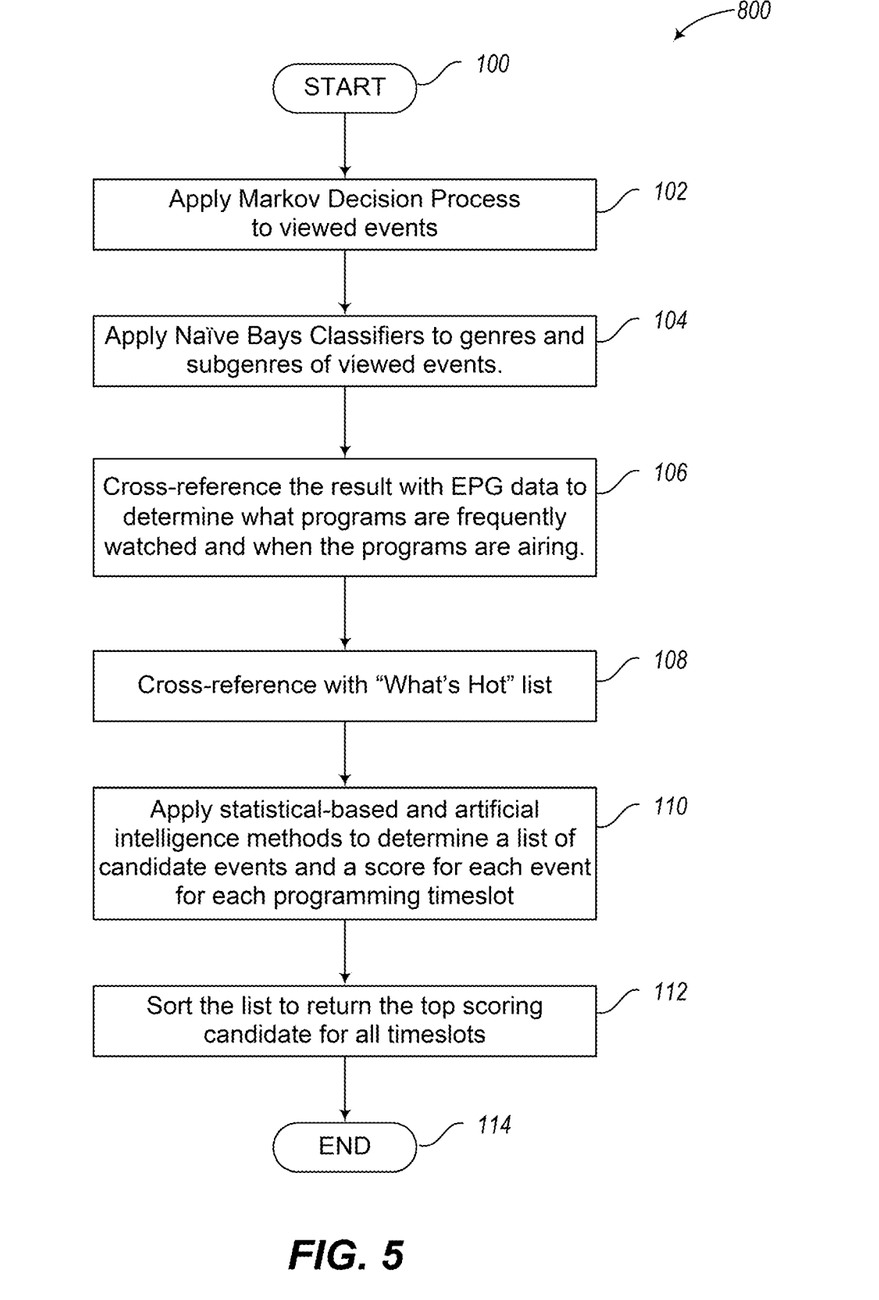
FIG. 5 shows an example algorithm for determining the closest event match given the viewing habits of a viewer.

FIG. 5 shows diagram 800 of a flow chart, "Algorithm to Determine the Closest Event Match to the Viewer's Viewing Habits," that describes an algorithm used to determine the closest audiovisual event match to the user's viewing habit. In one or more embodiments, this is a detail of step 84 in the flowchart of FIG. 4. At step 100, the method starts.

At step 102, the method applies a Markov decision process using the event viewing information for a viewer, for example all records of audiovisual events viewed on any given day. These audiovisual events may include live events that are watched off the program feed, as well as recorded or time-shifted events on the viewer's DVR 32. Markov decision process provides a mathematical framework for modeling decision making in situations where outcomes are partly random and partly under the control of a decision maker. More precisely, a Markov decision process is a discrete time stochastic control process. At each time step, the process is in some state S, and the decision maker may choose any action A that is available in state S. The process responds at the next time step by randomly moving into a new state S', and giving the decision maker a corresponding reward. The probability that the process moves into its new state S' is influenced by the chosen action. Thus, the next state S' depends on the current state S and the decision maker's action A. But given S and A, it is conditionally independent of all previous states and actions. Additional information on the Markov decision process can be found at http://en.wikipedia.org/wiki/Markov decision process, which is incorporated herein by reference in its entirety.

At step 104, the method applies Bayes classifiers to genres (themes) and subgenres (subthemes) of the watched events to determine the types of events the viewer has a habit of viewing, and when the events of that type are viewed. Naïve Bayes may also be used, which is a subset of Bays classifiers that are a family of simple probabilistic classifiers based on applying Bayes' theorem with strong (naive) independence assumptions between the features. Additional information on Bays classifiers and Naïve Bays classifiers can be found at http://en.wikipedia.orq/wiki/Baves classifier and http://en.wikipedia.org/wiki/Naive Bayes classifier, both of which are incorporated herein by reference in their entireties.

At step 106, the method takes the results of steps 102 and 104 and cross-references them with EPG data 36 to determine when desired audiovisual event names, genres and subgenres are viewable and on what channel they may be viewed in the future. This allows the event determination engine to identify the names and types of events and where they will appear in the future.

At step 108, the method cross-references the results of step 102, 104 and 106 with the "What's Hot" list that describes the most popular audiovisual events, including genres that are being watched by all viewers locally, regionally or nationally. In one or more embodiments, if there is insufficient information to identify a viewer's habit in order to determine what to present to the viewer, "What's Hot" information may be used as an additional data point.

At step 110, the method uses the data determined from the previous steps and uses statistical-based and/or artificial intelligence methods to determine a list of candidate events and a score for each event for each programming timeslot. In some instances, the programming timeslots correspond to a 30-minute timeslot corresponding to an EPG 36 timeslot.

At step 112, the method sorts and presents the top scoring candidate events that most closely match the viewer's viewing habits. The method ends at 114.

Figure 6:
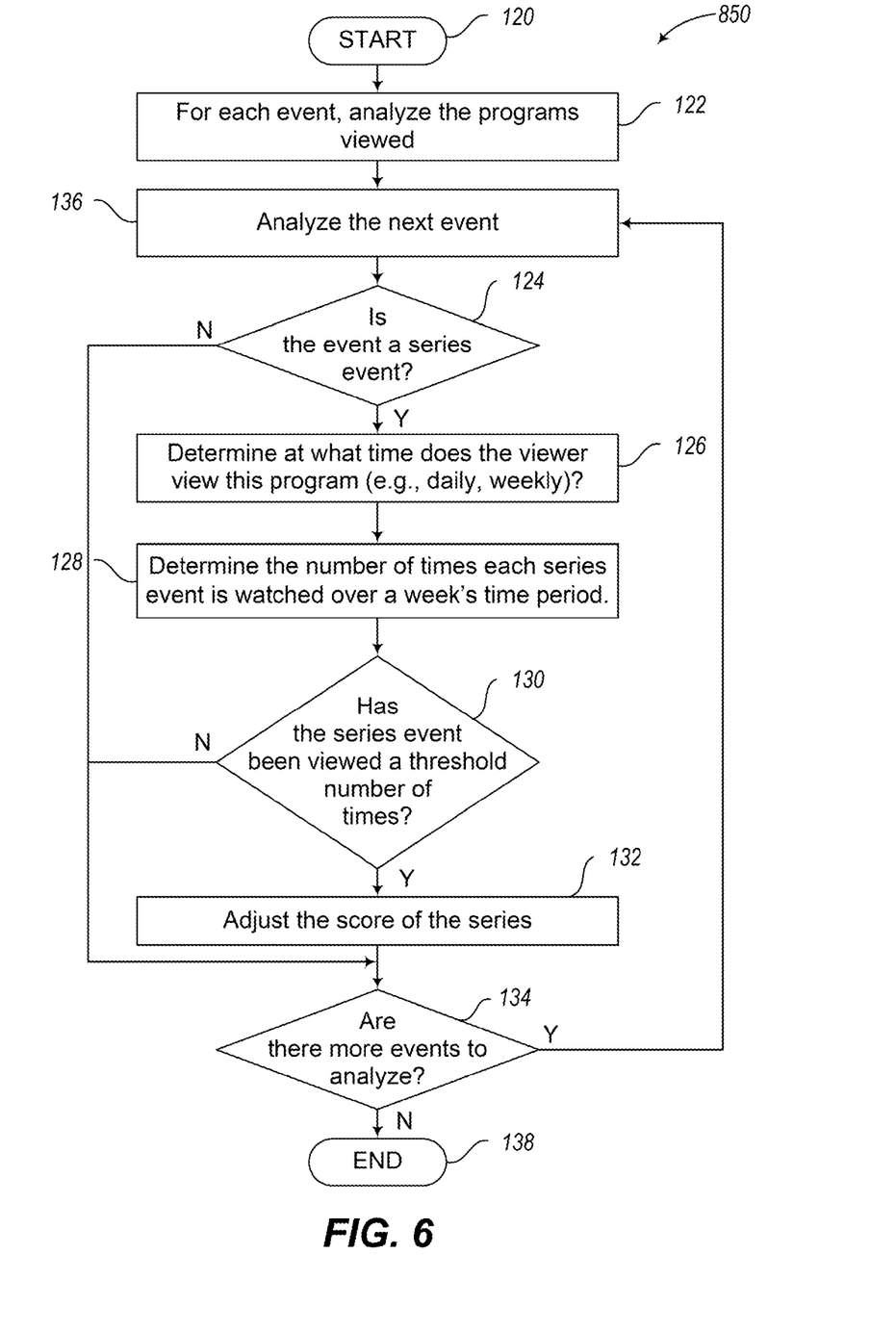
FIG. 6 shows an example flow diagram for applying a Markov decision process to the viewing history of a viewer.

FIG. 6 shows diagram 850 of a flow chart, "Apply Markov Decision Process to Viewing History," that describes an application of a Markov decision process to the viewing history of a viewer. In one or more embodiments, this is a detail of step 102 in the flowchart of FIG. 5. The method begins at 120.

At step 122, the method analyzes each event that the viewer has viewed. At step 124, the method determines whether the event is a series event. For example, a series may be a weekly series such as "Walking Dead," or a docuseries such as Ken Burns' "The Roosevelts" with episodes airing at non-regular intervals.

If the event is a series event, then the method at 126 determines at what time the viewer viewed the series episode. For example, was it viewed daily, every Monday at 7 PM, Sundays at 9 PM, etc. Next, at step 128, the method determines how many times each series episode has been watched. Then the method, at step 130, determines if the series has been viewed more than a threshold number of times. If it has, then at step 132 the method indicates that the viewer is interested in the series, and the series score should be adjusted accordingly. If it has not been watched a threshold number of times, then the series is disregarded.

At step 134, the method determines if there are more viewed audiovisual events to analyze. If so, at step 136 the next event is analyzed and flow of the method goes to step 124. Otherwise, if there are no more events to analyze, then the method ends at 138.

Figure 7A:
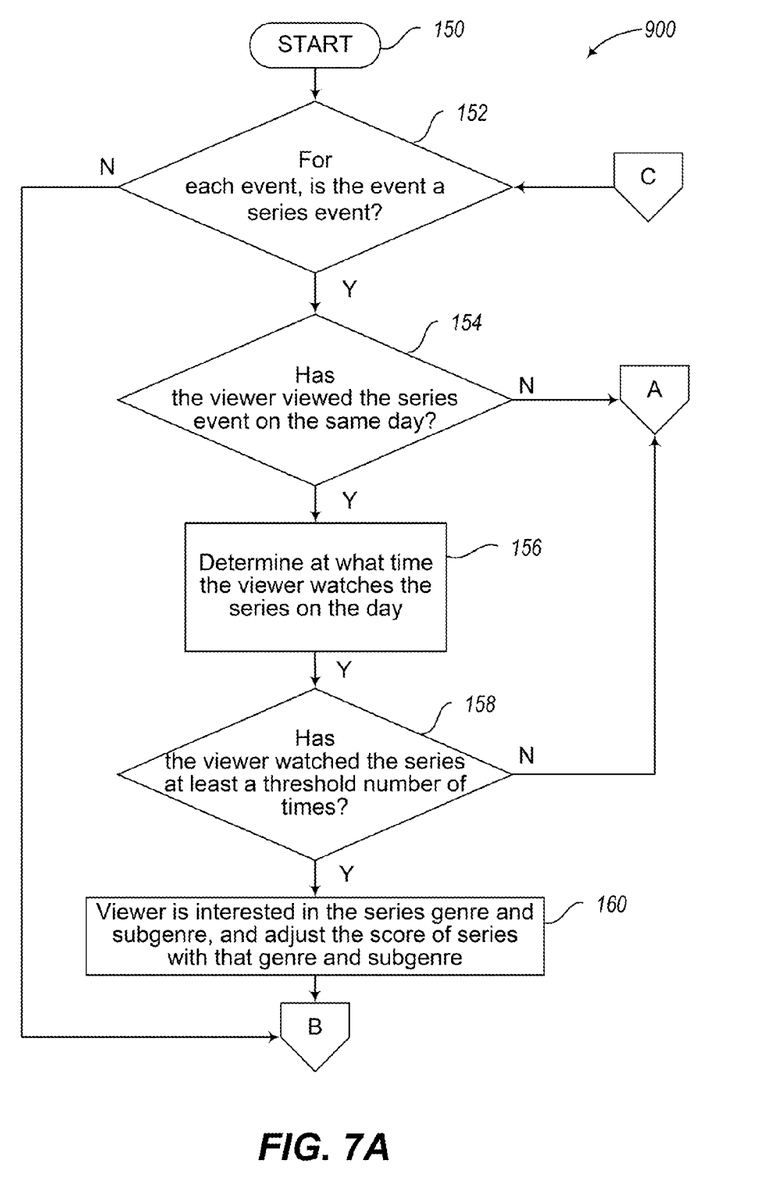
FIGS. 7A and 7B show an example flow diagram for applying Naïve Bayes classifiers to the viewing history of a viewer.
Figure 7B:
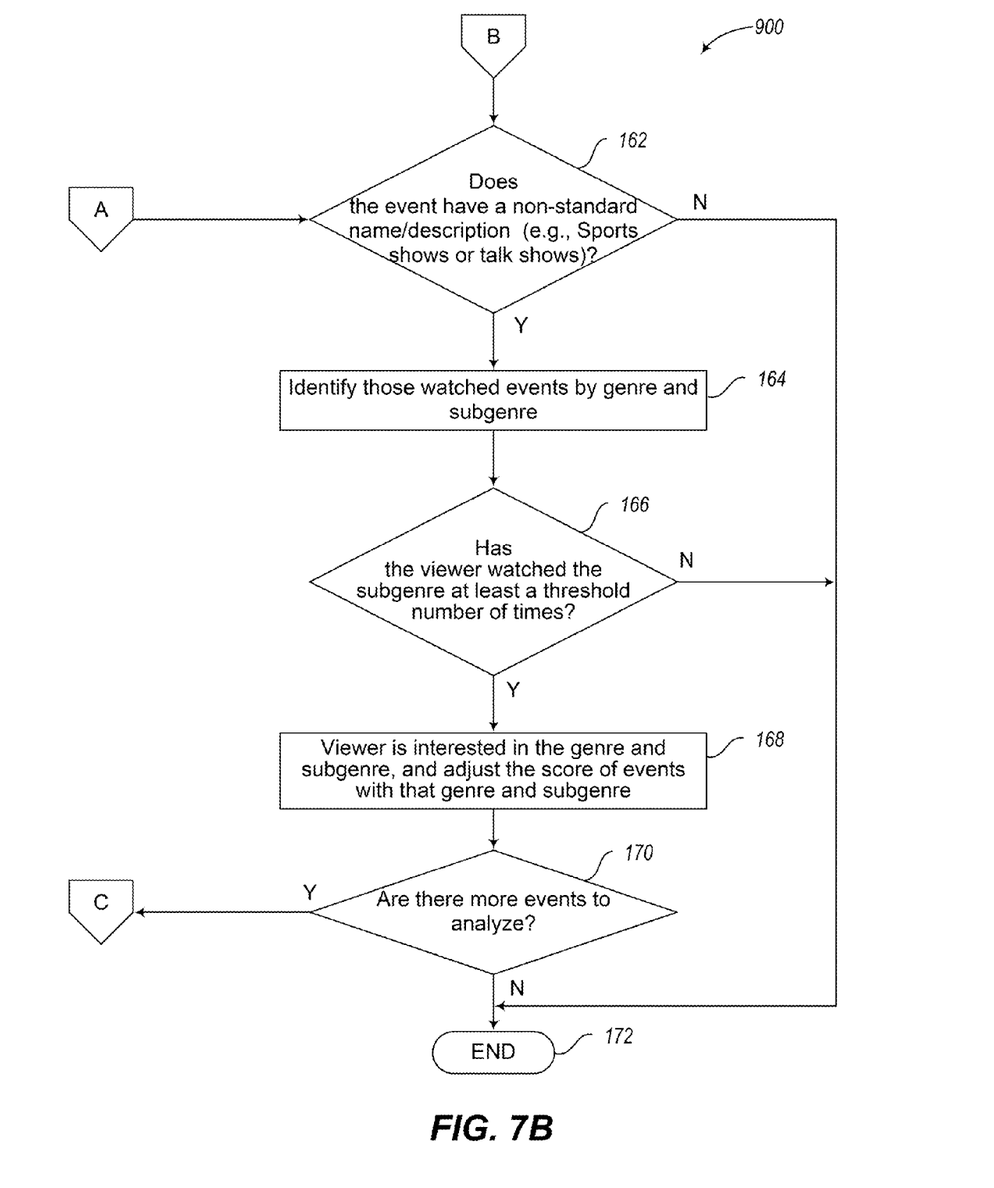

FIGS. 7A and 7B show diagram 900 of a flow chart, "Apply Naïve Bays Classifiers to Determine How Selection of an Event as a Habit Falls in a Category," that describes an application of a Naïve Bayes classifier to determine viewing habits based on genres and subgenres of viewed events. The method begins at 150.

At step 152, the method analyzes for each event whether the event is a series event. If so, at step 154 the method determines whether the viewer has viewed the series event on the same day of the week. In other embodiments, the viewing may occur at times other than the same day of the week. If so, at step 156 the method determines at what time the viewer watched the series. Next, at step 158, the method determines whether the viewer has watched the series episodes at least a threshold number of times. If so, at step 160, the method marks that the viewer is interested in the genre (theme) and subgenre (subtheme) of the series event and the score of series with that genre and subgenre is adjusted to reflect the user's interest.

At step 162, the method determines whether the event has a non-standard name or description as an indication that the event is identified by its genre (theme) and/or subgenre (subtheme). If so, at step 164 those watched events are identified by genre (theme) and/or subgenre (subtheme). For example, in this way the method can determine if the viewer regularly views baseball games that are listed with genre (sports) and subgenre (baseball). At step 166, the method determines if the viewer has watched the event at least a threshold number of times. If so, at step 168 the method indicates that the viewer is interested in the genre and/or subgenre, and the score of events with that genre and subgenre are adjusted to reflect the user's interest. Otherwise, information about the event is disregarded.

At step 170, the method determines if there are more audiovisual events to analyze. If so, at step 172 the method analyzes the next event, and the method proceeds to step 154. Otherwise, the method ends at 174.

Figure 8:
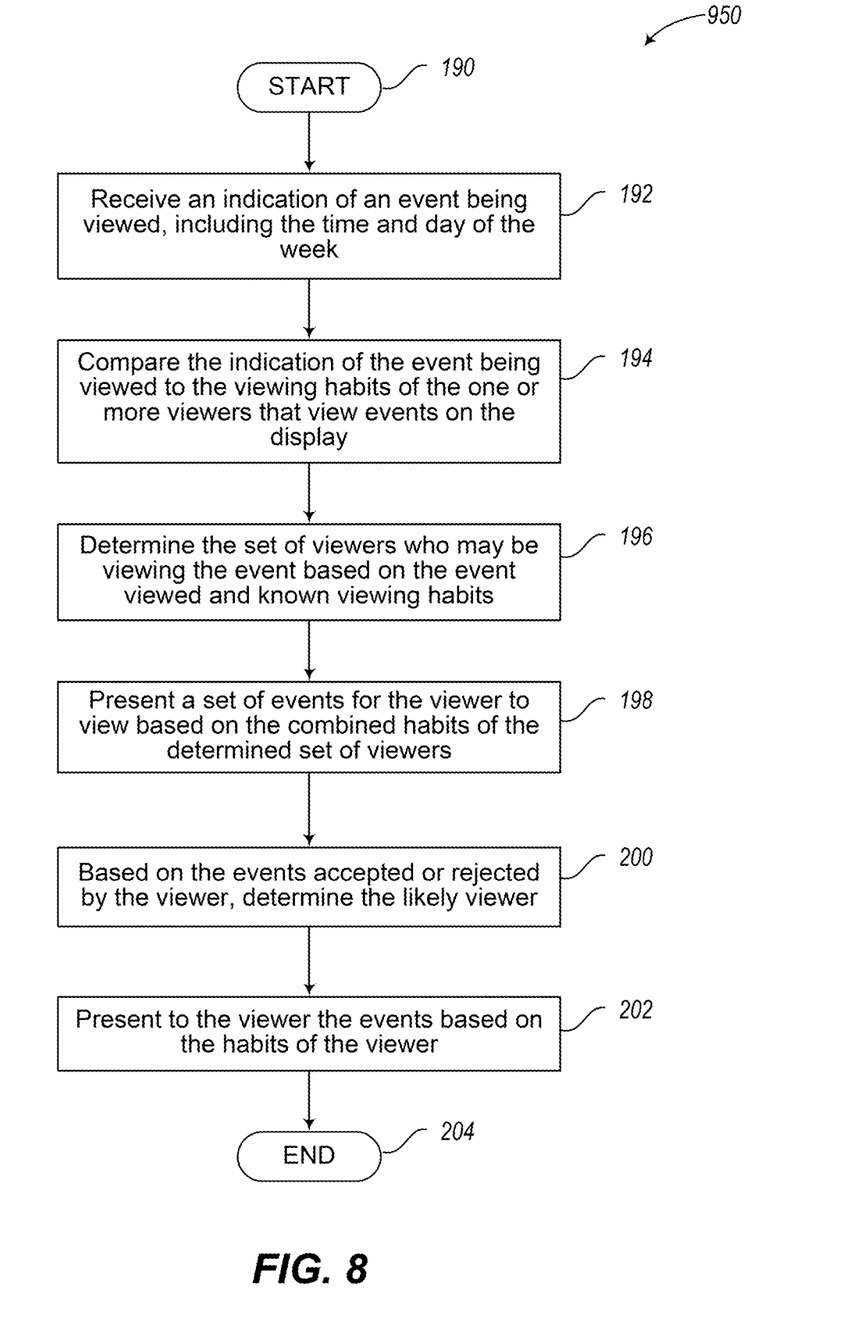
FIG. 8 shows an example flow diagram for determining the identity of a viewer based on the shows the viewer wants to watch and does not want to watch.

FIG. 8 shows diagram 950 of a flow chart, "Determine Views Based on Viewer Habits and Events Currently Watched by the Viewer," that describes a method of determining a viewer based on a list of viewer habits and events currently watched by the viewer. The method begins at 190.

At step 192, the method receives an indication of an event being viewed by the viewer, including the time and day of the week that the event is being viewed.

At step 194, the method compares the indication of the event being viewed to the viewing habits of the one or more viewers that view events on the display 24.

At step 196, the method determines the set of viewers who may be viewing the event, based on the event viewed and known viewing habits. There are a number of algorithms that may be used to determine who may be a likely viewer based on the events that have been viewed is something that are known in the art and available today.

At step 198, the method presents a set of events for the viewer to view based on the combined habits of the determined set of viewers.

At step 200, the method determines, based on the events accepted or rejected by the viewer and comparing that to the habits of the set of viewers, determine the likely viewer watching the display 24.

At step 202, the method presents to the viewer the preferred events based on the habits of the viewer. The method ends at 204.

Figure 9:
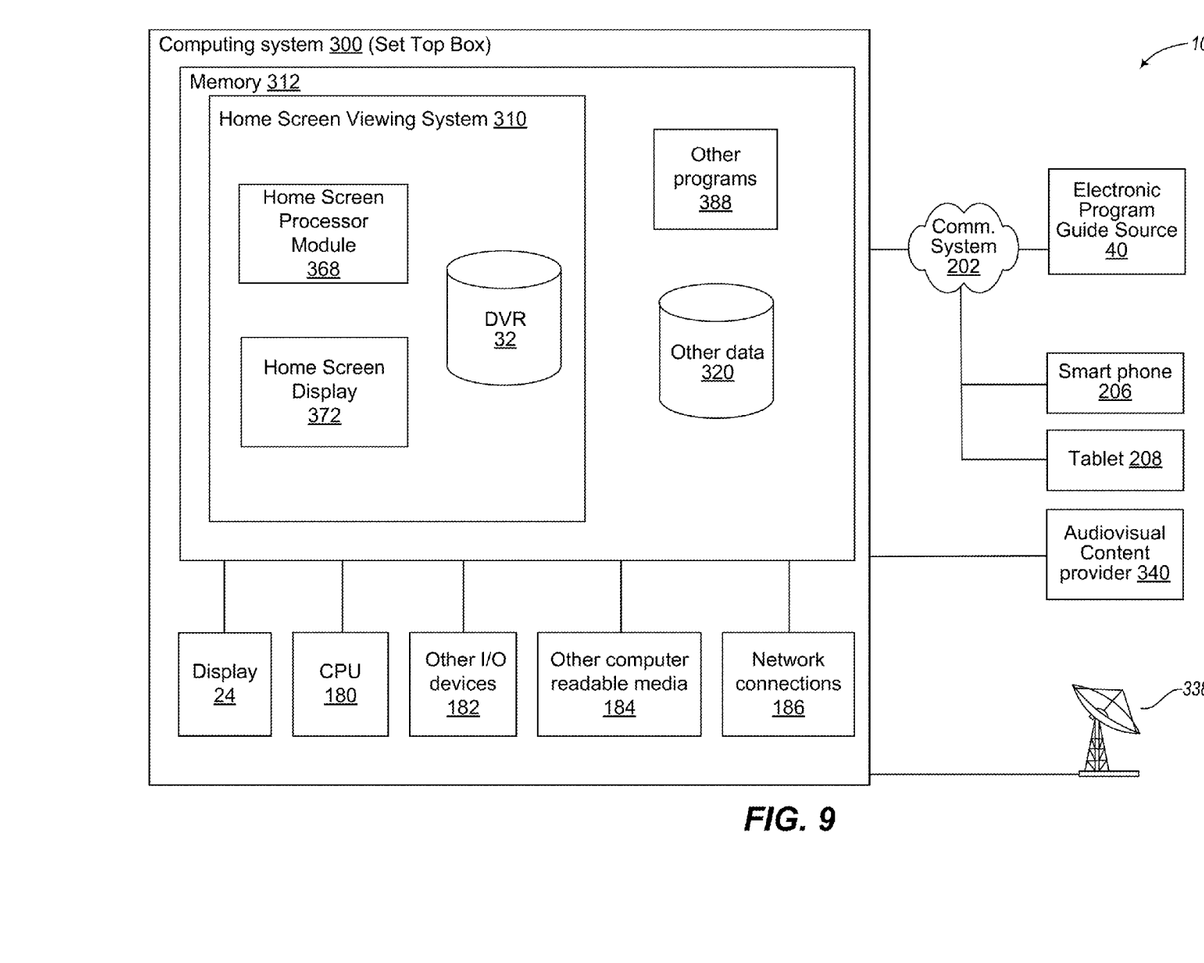
FIG. 9 is a schematic diagram of a computing environment in which systems and methods of implementing a Home Screen Processor and displaying content to a viewer based on viewing habits are implemented.

FIG. 9 shows diagram 1000 of one embodiment of a computing system for implementing a Home Screen viewing system 310. FIG. 9 includes a computing system 300 that may be utilized to implement Home Screen viewing system 310 with features and functions as described above. One or more general-purpose or special-purpose computing systems may be used to implement the Home Screen viewing system 310. More specifically, the computing system 300 may include one or more distinct computing systems present having distributed locations, such as within a set-top box, or within a personal computing device. In addition, each block shown may represent one or more such blocks as appropriate to a specific embodiment or may be combined with other blocks. Moreover, the various blocks of the Home Screen viewing system 310 may physically reside on one or more machines, which may use standard inter-process communication mechanisms (e.g., TCP/IP) to communicate with each other. Further, the Home Screen viewing system 310 may be implemented in software, hardware, firmware or in some combination to achieve the capabilities described herein.

In the embodiment shown, computing system 300 includes a computer memory 312, a display 24, one or more Central Processing Units ("CPUs") 180, input/output devices 182 (e.g., keyboard, mouse, joystick, track pad, LCD display, smart phone display, tablet and the like), other computer-readable media 184 and network connections 186 (e.g., Internet network connections or connections to audiovisual content distributors). In other embodiments, some portion of the contents of some or all of the components of the Home Screen viewing system 310 may be stored on and/or transmitted over other computer-readable media 184 or over network connections 186. The components of the Home Screen viewing system 310 preferably execute on one or more CPUs 180 and analyze the viewing behavior and determine the viewing habits of viewers to determine the live or time-shifted content to present to a viewer for any timeslot from information put into the system by users or administrators, as described herein. Other code or programs 388 (e.g., a Web server, a database management system, and the like), and potentially one or more other data repository 320, also reside in the computer memory 312, and preferably execute on one or more CPUs 180. Not all of the components in FIG. 9 are required for each implementation. For example, some embodiments embedded in other software do not provide means for user input, for display, for a customer computing system, or other components, such as, for example, a set-top box or other receiving device receiving audiovisual content.

In a typical embodiment, the Home Screen viewing system 310 includes a Home Screen Processor Module 368 and a Home Screen display module 172. Audiovisual event content is received from an Audiovisual Content provider 340, which may be provided by a network connection 186 or via satellite downlink 338. Other and/or different modules may be implemented. The Home Screen viewing system 310 also, in some embodiments, contains the DVR 32 and the Viewing Habits database 62. In addition, the Home Screen viewing system 310 interacts with communication system 202 with remote control 22, smart phone 206, and tablet 208. In some embodiments, remote control 22 includes controls that may be buttons, toggle switches, or other ways to communicate directly with the Home Screen viewing system 310; for example, a "Home Screen" button on remote control 22 that presents the audiovisual event on display 24 that most closely matches the event that matches the viewer's viewing habits, or the ability to scroll through a list of matched events for a number of timeslots. It may also be used, for example, to view and edit the Viewing habits database 62 or other configuration files used for the Home Screen viewing system.

The Home Screen Processing module 368 performs at least some of the functions of Home Screen Processor 44 described with reference to FIGS. 2 and 4-8. In particular, the Home Screen processing module 368 interacts with the set-top box viewing habits database 46, DVR 32 contents, "What's Hot" links 42, and the electronic programming guide (EPG) 36 to identify viewing habits in order to present the content the user will most likely want to view on the Home Screen for any given timeslot.

The Home Screen Processing module 368 takes information from the set-top box viewing habits database 46 that contains, for each viewer, a list of live audiovisual events that have been viewed, as well as time-shifted (recorded) events and the time they have been viewed. As described above, a number of different analysis techniques may be used with this data, including Markov decision processes, Naïve Bayes classifiers, and other statistical and artificial intelligence techniques to determine the viewing habits of the viewer. Once the viewing habits are determined, the processing module 368 searches for available audiovisual content to present to the viewer. In one example, the processing module 368 looks at the EPG database 52 and the contents of the DVR 32 that contains time-shifted content to determine what audiovisual events can be presented to the viewer in the current time slot, or any future timeslot. The processing module 368 then applies the viewing habits of the viewer to the available audiovisual events to determine the event to display to the viewer that the viewer is most interested in seeing.

The Home Screen display module 372 performs at least some of the functions as described in FIGS. 1-2 and 4-8. In one or more embodiments, this module will display the Home Screen that displays the event the viewer is most interested in seeing. In some embodiments, the viewer will select the Home Screen for viewing. In other embodiments, while the viewer is viewing other programming, the display module will interrupt the display and ask the viewer if they would like to either view a different audiovisual event they may be more interesting in viewing, or if the viewer would like to record the event for later viewing.

In other embodiments, the Home Screen display module 372 in conjunction with the Home Screen processing module 368 are able to determine, based on the event being currently viewed and the responses to the presentation of different audiovisual event options from which the viewer can select, the identity of the viewer. Once the viewer identity is determined, the audiovisual events that most closely match the viewing habits of the viewer can be presented on the Home Screen.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, by a receiving device programmed with software that performs a Bayes-type process and software that performs a Markov-type process, data for a plurality of audiovisual programs viewed using the receiving device, the data for each program including at least an identifier for the program, a timeslot in which the program was viewed, a timeslot the program was recorded, and a classification of the program;
analyzing, by the receiving device, using the software that performs the Markov-type process, the data for the plurality of audiovisual programs viewed using the receiving device, the analyzing including, in response to determining that an audiovisual program is part of a series and that the audiovisual program has been viewed at least a first threshold number of times within a predetermined time period, adjusting a score value of the series;
analyzing, by the receiving device, using the software that performs the Bayes-type process, the data for the plurality of audiovisual programs viewed using the receiving device, the analyzing including, in response to determining that the series has been viewed at least a second threshold number of times, adjusting a score value of another series having a same genre and a same subgenre as the series of which the audiovisual program is part;
receiving, by the receiving device, data for a plurality of audiovisual programs that are available to be viewed for a timeslot, the data including at least an identifier for each of the plurality of available programs and a classification for each of the available programs;
selecting, by the receiving device, one of the available programs based on the score values adjusted by the software that performs the Markov-type process and the software that performs the Bayes-type process and the received available program data; and
outputting, to a display device, data representative of the selected one of the audiovisual programs that are available to be viewed for the timeslot.

2. The method of claim 1, wherein Bayes-type further includes Naïve Bayes Classifications.

3. The method of claim 1, wherein Markov-type processes further includes a Markov Decision Process.

4. The method of claim 1,
wherein the identifier for the program further includes at least one of program name, program series name, and program identification number; and
wherein the classification of the program further includes at least one of program genre and program subgenre.

5. The method of claim 1 wherein analyzing the received viewing data and the received available program data includes:
analyzing the viewing data of the viewed programs to determine data associated with repeated viewing patterns for each viewed program;
outputting the determined data associated with repeated viewing patterns for each viewed program;
comparing the received data for each one or more available programs for each timeslot during which the available program may be viewed with the determined data associated with repeated viewing patterns for each viewed program;
based on the comparison, assigning a score value to each one or more available programs for each timeslot during which the one or more available programs may be viewed; and
outputting an indication of the score value and program identifier for each one or more available programs for each timeslot during which the one or more available programs may be viewed.

6. The method of claim 5 wherein each one or more available programs for each timeslot during which the one or more available programs may be viewed further includes at least one of:
a recorded program that is viewable during the timeslot, or
a live program identified by an electronic programming guide, the live program able to be received from an audiovisual content source during the timeslot.

7. The method of claim 5 wherein comparing the received data for each one or more available programs for each timeslot during which the one or more available programs may be viewed with the determined data associated with repeated viewing patterns for each viewed program further includes determining:
whether the one or more available programs is typically viewed live,
whether the one or more available programs is typically recorded, and if so when it is recorded and in what timeslot it is typically viewed,
whether the one or more available programs genre is typically viewed in the timeslot,
whether the one or more available programs subgenre is typically viewed in the timeslot, and
the number of times the one or more available programs has been viewed.

8. The method of claim 5, further comprising:
receiving an indication of a timeslot;
outputting an indication of the one or more available programs along with their score values for the indicated timeslot.

9. The method of claim 5, further comprising:
receiving current viewing data for the one or more available programs for the current timeslot within a geographic area,
analyzing the received current viewing data to determine the most frequently viewed one or more available programs within the geographic area, and
updating the score value for each one or more available programs for the current timeslot based on the determined most frequently viewed one or more available programs within the geographic area for the current timeslot.

10. A system, comprising:
a processor;
a communications network connected to the processor;

a non-transitory computer-readable memory communicatively coupled to the processor, the memory programmed with software that performs a Bayes-type process and software that performs a Markov-type process and storing computer-executable instructions that, when executed, cause the processor to:

receive data for a plurality of audiovisual programs viewed using a receiving device, the data including for each program at least an identifier for the program, a timeslot the program was viewed, a timeslot the program was recorded, and a classification of the program;

analyze, using the software that performs the Markov-type process, the data for the plurality of audiovisual programs viewed using the receiving device, wherein, in response to determining that an audiovisual program is part of a series and that the audiovisual program has been viewed at least a first threshold number of times within a predetermined time period, the software that performs the Markov-type process adjusts a score value of the series;

analyze, using the software that performs the Bayes-type process, the data for the plurality of audiovisual programs viewed using the receiving device, wherein, in response to determining that the series has been viewed at least a second threshold number of times, the software that performs the Bayes-type process adjusts a score value of another series having a same genre and a same subgenre as the series of which the audiovisual program is part;

receive data for one or more available programs for each timeslot during which the one or more available programs may be viewed, the data including at least an identifier for each of the one or more available programs and a classification for each of the one or more available programs;

select one of the available programs based the score values adjusted by the software that performs the Markov-type process and the software that performs the Bayes-type process and the received available program data; and output, to a display device, data representative of the selected one of the available programs.

11. The system of claim 10, wherein the identifier for the program further includes at least one of program name, program series name, and program identification number; and wherein the classification of the program further includes at least one of program genre and program subgenre.

12. The system of claim 10 wherein analyze the received viewing data and the received available program data includes:

analyze the viewing data of the viewed programs to determine data associated with repeated viewing patterns for each viewed program;

output the determined data associated with repeated viewing patterns for each viewed program;

compare the received data for each one or more available programs for each timeslot during which the available program may be viewed with the determined data associated with repeated viewing patterns for each viewed program;

based on the comparison, assign a score value to each one or more available programs for each timeslot during which the one or more available programs may be viewed; and output an indication of the score value and program identifier for each one or more available programs for each timeslot during which the one or more available programs may be viewed.

13. The system of claim 12 wherein each one or more available programs for each timeslot during which the one or more available programs may be viewed further includes at least one of:

a recorded program that is viewable during the timeslot, or a live program identified by an electronic programming guide, the live program able to be received from an audiovisual content source during the timeslot.

14. The system of claim 12 wherein compare the received data for each one or more available programs for each timeslot during which the one or more available programs may be viewed with the determined data associated with repeated viewing patterns for each viewed program further includes determining:

whether the one or more available programs is typically viewed live, whether the one or more available programs is typically recorded, and if so when it is recorded and in what timeslot it is typically viewed, whether the one or more available programs genre is typically viewed in the timeslot, whether the one or more available programs subgenre is typically viewed in the timeslot, and the number of times the one or more available programs has been viewed.

15. The system of claim 14, further comprising:

receive an indication of a timeslot;

output an indication of the one or more available programs along with their score values for the indicated timeslot.

16. The system of claim 12, further comprising:

receive current viewing data for the one or more available programs for the current timeslot within a geographic area, analyze the received current viewing data to determine the most frequently viewed one or more available programs within the geographic area, and update the score value for each one or more available programs for the current timeslot based on the determined most frequently viewed one or more available programs within the geographic area for the current timeslot.

* * * * *